US006153339A

United States Patent [19]

Huston et al.

[11] Patent Number: 6,153,339
[45] Date of Patent: Nov. 28, 2000

[54] VOLUME HOLOGRAPHIC DATA STORAGE WITH DOPED HIGH OPTICAL QUALITY GLASS

[75] Inventors: Alan L. Huston; Brian L. Justus, both of Springfield, Va.

[73] Assignee: The United States of America as represented by the Secretary of the Navy, Washington, D.C.

[21] Appl. No.: 09/052,118

[22] Filed: Mar. 31, 1998

[51] Int. Cl.[7] ........................................ G03H 1/04
[52] U.S. Cl. ........................... 430/1; 430/2; 359/7; 359/3
[58] Field of Search ................... 430/1, 2, 290; 359/3, 4, 7

[56] References Cited

U.S. PATENT DOCUMENTS

| | | | |
|---|---|---|---|
| 4,474,427 | 10/1984 | Hill et al. | 350/320 |
| 5,383,038 | 1/1995 | Lawandy | 359/7 |
| 5,434,878 | 7/1995 | Lawandy et al. | 372/43 |
| 5,585,640 | 12/1996 | Huston et al. | 250/483.1 |
| 5,606,163 | 2/1997 | Huston et al. | 250/337 |
| 5,811,822 | 9/1998 | Huston et al. | 250/484.4 |

FOREIGN PATENT DOCUMENTS

| | | |
|---|---|---|
| 4-293027 | 10/1992 | Japan . |
| WO95/26519 | 10/1995 | WIPO . |

OTHER PUBLICATIONS

Hill et al., "Photosensitivity in optical fiber waveguides: . . . " Appl. Phys. Lett., vol. 32(10), pp. 647–649, May 1978.

Melles Griot Catalog 1995/1996, pp. 48–2 to 48–5.

Meltz, G., et al., "Formation of Bragg gratings in optical fibers by a transverse holographic method" Opt. Lett., vol. 14(15) pp. 823–825, Aug. 1989.

Partovi, A. et al "Volume Holographic Storage in Hydrogen Treated Germano–Silicate Glass" Appl. Phys. Lett. 64(4) (1994), pp. 821–823.

Huston, A.L. and Justus B.L. "Photoreversible Birefringence in Doped Vycor Glass" Optics Letters, vol. 20, No. 9, May 1, 1995, pp. 952–954.

Partovi, A. et al, "Volume Holographic Storage in Germano–Silicate Glass" CLEO '94, Summaries of Papers at the COnference on Lasers and Electro–Optics, vol. 8 1994 Technical Digest Series. Conference Edition (Cat. No. 94CH3463–7), p. xvi+448, 7–8.

Erdogan, et al, "Volume Gratings for Holographic Storage Applications Written in High–Quality Germanosilicate Glass" Applied Optics, vol. 34, No. 29, Oct. 10, 1995, pp. 6738–6743.

Justus, B.L., Johnson, T.L. and Huston, A.L. "Radiation Dosimetry using Thermoluminescence of Semiconductor–Doped Vycor Glass" Nucl. Instr. and Meth. Phys Res. B 95, 533 (1995).

Justus, B.L., Johnson, T.L. and Huston, A.L. "Laser–Heated Radiation Dosimetry Using Transparent Thermoluminescent Glass" Appl. Phys. Lett. 68, 1 (1996).

Justus, B.L., Johnson, T.L. and Huston, A.L. "Fiber Optic–Coupled, Laser–Heated Thermoluminescence Dosimeter for Remote Radiation Sensing" Appl. Phys. Lett. 68, 3377 (1996).

*Primary Examiner*—Martin Angebranndt
*Attorney, Agent, or Firm*—Barry A. Edelberg; Amy Loch Ressing

[57] ABSTRACT

A volume hologram is created by exposing a volume holographic optical storage medium comprising a doped optically transparent glass matrix having a scattering coefficient of less than $10^{-5}$ cm$^{-1}$ to an interference pattern created by intersecting a spatially modulated object beam with a reference beam, the object beam and the reference beam each having a wavelength of less than about 300 nm. The glass matrix may be doped with any of the following: (1) nanocrystalline semiconductor particles and an activator, (2) an alkaline earth sulfide, Sm ions, and an additional dopant selected from the group consisting of Eu ions and Ce ions, (3) ZnS and an additional dopant selected from the group consisting of Pb ions, Cu ions, and Mn ions and (4) Cu or Ce ions.

4 Claims, 1 Drawing Sheet

VOLUME HOLOGRAPHIC DATA STORAGE WITH DOPED HIGH OPTICAL QUALITY GLASS

BACKGROUND OF THE INVENTION

1. Field of the Invention

The invention relates generally to volume holographic data storage and more particularly to volume holographic data storage using doped high optical quality glass.

2. Description of the Related Art

In holography, a photosensitive medium is exposed to an interference pattern that is generated by intersecting a spatially-modulated information-carrying object beam with a coherent reference beam. The photosensitive medium records the interference pattern through some spatially-modulated change in the optical properties of the medium. The recorded information can then later be retrieved by exposing the medium to the reference beam, which is diffracted by the medium in such a manner as to reconstruct the object beam.

In volume holographic data storage, the object beam encodes a page of input data and the interference pattern is recorded three-dimensionally in the photosensitive medium. If the photosensitive medium is thick enough, multiple pages of input data can be recorded or multiplexed in the same volume element, for example by varying the angle between the object and reference beams or by varying the wavelength of the object and reference beam.

Although volume holographic data storage has been known for several decades and volume holograms have been recorded in a variety of media, commercial development of volume holographic data storage has been hampered by lack of a storage medium that meets all the requirements for technical and commercial feasibility. In particular, the characteristics of the ideal optical storage medium include high optical quality and low scatter, a large refractive index modulation, high sensitivity, long shelf life and low material costs. Further, an ideal material should not require additional chemical or physical treatment to fix it for long term storage. The material should be erasable, yet should be able to be read without accidentally erasing. For a description of desirable criteria for a volume holographic storage medium, see, for example, G. T. Sincerbox, "Holographic storage—the quest for the ideal material continues," Opt. Mat. 4, 370–375 (1995) and M. P. Bernal, G. W. Burr, H. Coufal, R. K. Grygier, J. A. Hoffnagle, C. M. Jefferson, R. M. Macfarlane, R. M. Shelby, G. T. Sincerbox and G. Wittman, "Holographic-Data-Storage Materials," MRS Bulletin, 51–60 (September, 1996), both incorporated herein by reference. Even. the very best material previously identified for holographic storage applications, lithium niobate, suffers from a number of deficiencies, including relatively low sensitivity, erasure of data upon readout and insufficient optical quality.

A volume holographic storage medium of hydrogen-treated germano-silicate glass is disclosed in Partovi, A. et al "Volume Holographic Storage in Hydrogen Treated Germano-Silicate Glass" Appl. Phys. Lett. 64(4) (1994), pp 821–823. Since hydrogen loading is required for the material to function as a recording medium, its sensitivity diminishes over time as hydrogen diffuses out of the medium.

U.S. Pat. No. 5,383,038 to Lawandy describes a volume holographic medium made up of bulk glass containing embedded semiconductor microcrystallites. The storage medium is described in connection with a process of operating a holographic memory in which the glass is irradiated with two light beams; with one beam having a wavelength that is half the wavelength of the other beam. The information is read out at only the shorter wavelength. This method has the disadvantage that the particular high energy wavelength used in recording the hologram must be used in reading the hologram.

SUMMARY OF THE INVENTION

Accordingly, it is an object of the present invention to provide a method for creating a volume hologram wherein noise and light scatter in the storage medium are minimized.

It is a further object of the invention to provide a method that allows a plurality of volume holograms to be recorded in a thick storage medium.

It is a further object of the invention to provide a method for creating a volume hologram that can be read many times without erasing.

It is a further object of the invention to provide a method for creating a volume hologram that does not require additional chemical or physical treatment to fix the volume hologram for long term storage.

It is a further object of the invention to provide a method for creating a volume hologram that can be easily erased and rewritten.

It is a further object of the invention to provide a method for creating a volume hologram wherein the wavelength of the light beam used to read the hologram is not restricted to the particular wavelength used to record the hologram.

These and additional objects of the invention are accomplished in a method of creating a volume hologram comprising the steps of providing a volume holographic optical storage medium comprising a doped optically transparent glass matrix having a scattering coefficient of less than $10^{-5}$ $cm^{-1}$ and exposing the medium to an interference pattern created by intersecting a spatially modulated object beam with a reference beam, the object beam and the reference beam each having a wavelength of less than about 300 nm. The glass matrix may be doped with any of the following, representing alternative embodiments of the invention: (1) nanocrystalline semiconductor particles and an activator, (2) an alkaline earth sulfide, Sm ions, and an additional dopant selected from the group consisting of Eu ions and Ce ions, (3) ZnS and an additional dopant selected from the group consisting of Pb ions, Cu ions, and Mn ions and (4) Cu or Ce ions. The doped glass has the property that when it is irradiated with light having a wavelength of less than about 300 nm, the excitation energy is stored as trapped charges in the glass. The trapped charges modify the complex index of refraction of the glass. This property allows the doped glass to be used in storing volume holograms. When the doped glass is exposed to a three-dimensional interference pattern created by intersecting a spatially modulated object beam with a reference beam, the interference pattern is recorded and stored as a spatially modulated pattern of long-lived trapped charges within the glass. The spatially modulated alterations in the index of refraction created thereby allow the data contained in the object beam to be reconstructed holographically by use of a reference laser source in the visible or infrared.

The doped glasses described above have several advantages that make them ideal for use as volume holographic storage media. First, the dopants used are sufficiently sensitive to UV radiation so that only a low concentration of the dopant is necessary to adequately record data. Moreover, the dopants are either in nanocrystalline form, or else are small molecules or ions. Thus, light scattering is minimized in the recording and reading of stored data. By using high optical quality glass, scattering is further minimized.

BRIEF DESCRIPTION OF THE DRAWINGS

A more complete appreciation of the invention will be readily obtained by reference to the following Description of the Preferred Embodiments and the accompanying drawings, wherein.

DESCRIPTION OF THE PREFERRED EMBODIMENTS

Figure 1:
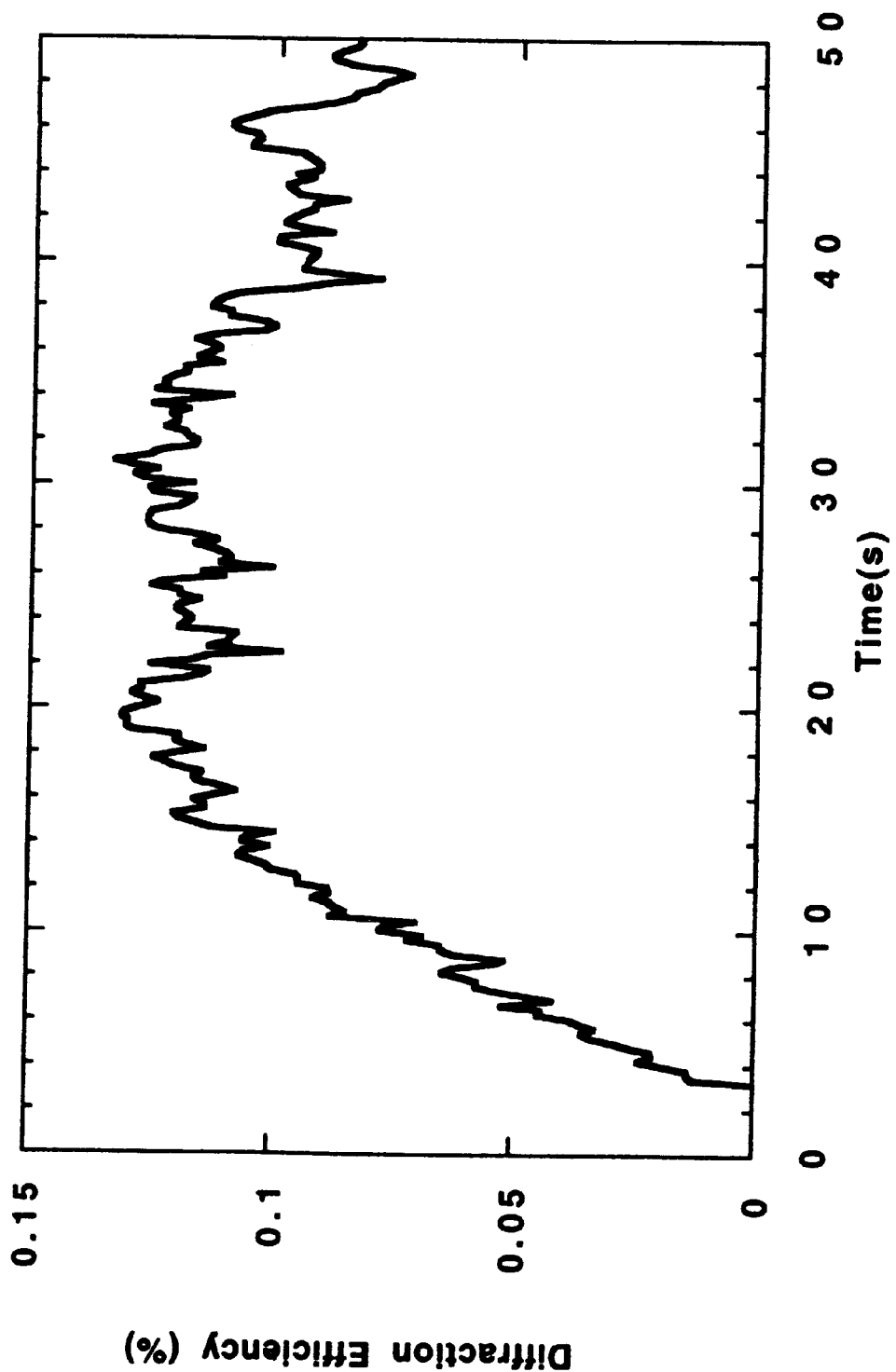
FIG. 1 is a graph of measured diffraction efficiency vs. exposure time for a 2 mm thick sample of europium-doped glass exposed to a single mode KrF excimer laser operating at 248 nm at a repetition rate of 2 Hz.

The invention relates to a method of creating a volume hologram comprising the steps of providing a volume holographic optical storage medium comprising a doped optically transparent glass matrix having a scattering coefficient of less than $10^{-5}$ cm$^{-1}$ and exposing the medium to an interference pattern created by intersecting a spatially modulated object beam with a reference beam, the object beam and the reference beam each having a wavelength of less than 300 nm.

Doped glass materials suitable for use in the invention and methods for making them are described in U.S. Pat. No. 5,585,640, in Huston et al, U.S. patent application Ser. No. 08/848,259, filed Apr. 29, 1997 entitled "OPTICALLY TRANSPARENT, OPTICALLY STIMULABLE GLASS COMPOSITES FOR RADIATION DOSIMETRY", in Huston, A. L and Justus B. L. "Photoreversible Birefringence in Doped Vycor Glass" Optics Letters, Vol 20, No. 9, May 1, 1995, pp 952–954, in Justus, B. L., Johnson, T. L. and Huston, A. L. "Radiation Dosimetry Using Thermoluminescence of Semiconductor-Doped Vycor Glass" Nucl. Instr. and Meth. Phys Res. B. 95, 533 (1995), in Justus, B. L., Johnson, T. L. and Huston, A. L. "Laser-Heated Radiation Dosimetry Using Transparent Thermoluminescent Glass" Appl. Phys. Lett. 68, 1 (1996) and in Justus, B. L., Johnson, T. L. and Huston, A. L. "Fiber Optic-coupled, Laser-Heated Thermoluminescence Dosimeter for Remote Radiation Sensing" Appl. Phys. Lett. 68, 3377 (1996), each incorporated herein by reference. For purposes of the present invention, additional requirements are that the glass starting material be limited to fused quartz and fused silica and that the concentration of dopant be kept low so that the dopant does not significantly reduce the transparency of the glass.

In the first embodiment, the volume holographic storage medium is a glass matrix doped with nanocrystalline semiconductor particles and an activator. The nanocrystalline semiconductor particles and activator may be the same as those disclosed in U.S. Pat. No. 5,585,640. Specifically, the activated nanocrystalline semiconductor particles may be manufactured, for example, from type II–VI semiconductors, of which ZnS is an example, alkali halides, of which potassium chloride is an example, or alkaline earth sulfides, of which calcium sulfide is an example. The activator and/or co-activator ions can be chosen from the rare earth metals, of which europium is an example, or the transition metals, of which manganese is an example. Co-activators also often include halogens of which chloride is an example.

The second through fourth embodiments of the present invention use the same dopants as described in the first through third embodiments of U.S. application Ser. No. 08/848,259. In the second embodiment of the present invention, any alkaline earth sulfide may be used as the alkaline earth sulfide dopant. Typical alkaline earth sulfides useful in the present invention include MgS, CaS, SrS, and BaS. When more than one co-activator is used, the additional coactivator is typically Eu, Ce, or a mixture thereof. Other rare earths should also be useful, in place of or in combination with Eu and/or Ce, as additional co-activators.

The third embodiment of the present invention also employs a sulfide component and an activator. In this third embodiment, however, the metal sulfide component is ZnS, and only a single activator, such as Cu, Pb, Mn, or Ce is required.

In a fourth embodiment of the present invention, the glass matrix includes Cu or Ce dopants in the absence of a metal sulfide component, or even in the absence of any sulfide component.

In embodiments two through four of the present invention, the optically stimulable glasses are typically prepared by diffusing the dopants (including sulfide components) into the glass matrix. Because the dopants are diffused into the glass matrix, the glass matrix may be either porous or fused (non-porous).

The dopants may be diffused into the glass matrix by a wide variety of methods. For example, if the glass matrix is porous, it may be contacted with a solution of salts of the desired dopant metals for a sufficiently long time to diffuse the salts into the porous glass. Thereafter, the 5 porous glass matrix is dried. In those embodiments that include a metal sulfide component that would be insoluble in the dopant solution used, the dopant solution may contain a soluble salt of the metal portion of the sulfide. After drying, the glass may be sulfided (for example by exposure to gaseous H$_2$S at elevated temperatures, typically about 100° C.) to provide the desired metal sulfide diffused into the .porous glass. The porous glass matrix is then consolidated and activated, for example using any of the consolidation and/or activation methods described in U.S. Pat. No. 5,585,640.

In fused glass, the dopants may be diffused, for example, by dipping the fused glass matrix into an organic-inorganic sol gel (e.g., an organosilicate sol gel) including a salt or salts of the dopant metals. The fused glass matrix is then withdrawn from the sol gel at a slow, steady rate to result in the formation of a porous, thin (typically less than about one micron thick) sol-gel film containing the salt or salts. Upon drying (typically at room temperature to about 200° C.). the organic constituents of the film volatilize and/or decompose, leaving behind aporous, film (a high silica film where an organosilicate sol-gel was used) containing the salts. The glass having the porous film thereon may be sulfided (for example by exposure to gaseous H$_2$S at elevated temperatures, typically about 100° C.) to provide metal sulfides, if desired. The resulting material is then activated, typically after being placed within a glass (e.g., silica) tube that is then placed within a tube furnace. If sulfiding is not desired, the decomposition and activation steps may be combined, for example, by heating the sol-gel film to a sufficiently high temperature to decompose the organics and diffuse the resulting metal(s) into the glass and activate them. Appropriate conditions for activation are the same as those described for the activation of porous glasses. Of course, the fused glasses made according to the present invention do not require consolidation. Porous glass matrices may also be doped using this sol gel method.

After several doping operations have been performed, the fused glass tube used to hold the glass samples during activation can become a source of dopants. Untreated glass (fused or porous) may then be doped and activated by heating to activation temperatures of typically over 1000° C. while inside the previously used glass tube. This effect apparently results from doping of the glass with small amounts of the dopant ions. During heat treatment, a low vapor pressure of the dopant atoms or ions is created that bathes the undoped glass in a doping atmosphere. The doping elements diffuse into the fused or porous glass material. The optical stimulable luminescence (OSL) activity of fused glasses treated in this manner may be further enhanced by repeated heat treatments in the presence of unconsolidated metal sulfide-containing pieces of Vycor™ or other porous glass. In this manner, sheets, rods, tubes, films and spheres of glass may be doped.

As should be apparent from the above description of doping untreated glasses by heat treatment within a doped fused glass (e.g., silica, alumina, or borate) tube, the dopants need be present in only minute amounts within the glass to cause significant and useful OSL activity. Thus, it is extremely difficult to quantitatively define a minimum dopant level required to obtain useful charge trapping. The maximum doping level is that at which either the dopants within the glass matrix obtain crystallite sizes sufficiently large to significantly increase scattering, or the charge trapping effect is significantly attenuated by a self-quenching mechanism.

The dopant salts used in the solutions and sol gels discussed above are typically selected so that the salt is soluble in the solution or sol gel and the anion component of the salt, upon reduction, forms a gas or mixture of gases that are non-reactive, or beneficially reactive, with the doped glass matrix. The concentrations of these salts in the sol gels and solutions may vary widely. For example, each salt is typically present at a concentration of about 0.001 g per 100 ml solution up to its saturation point at the temperature at which the glass matrix is contacted with the solution or sol gel.

The material of the four embodiments described above may be shaped by any known means before, during or after the doping process into a physical configuration suitable for recording a volume hologram. For example, the doped glass may be formed into cubes, sheets, rods, tubes, cylinders, fibers or spheres.

The creation of a volume hologram in a volume holographic optical storage medium made of one of the four embodiments of doped glass media described above is accomplished by exposing the medium to an interference pattern created by intersecting a spatially modulated object beam with a reference beam, the object beam and the reference beam each having a wavelength of less than 300 nm. By doing so, a spatially modulated pattern of trapped charges is created within the volume of the medium. The trapped charges create an optically readable change in the complex index of refraction of the medium. The volume hologram may be read many times by using a wavelength that is outside the trapped-charge-creation band of the glass, that is, a wavelength greater than about 300 nm. Preferably, a low power laser operating at a wavelength in the near infrared or infrared is used to read the volume hologram. A plurality of volume holograms may be recorded and read within the volume holographic optical storage medium by techniques of angular and wavelength multiplexing known in the art.

The physical apparatus and process steps for creating and reading a volume hologram may be any physical apparatus and process steps known in the art for creating and reading volume holograms, with the provision that the volume holographic optical storage medium be one of the embodiments described above and that the object beam and reference beam used in creating the volume hologram each have a wavelength of less than about 300 nm. The enabling technologies for creating and reading volume holograms and for storing and retrieving volume holographic high density data are well developed. See, for example, the discussion of digital holographic data storage technology in G. T. Sincerbox, "Holographic storage—the quest for the ideal material continues," Opt. Mat. 4, 370–375 (1995), in M. P. Bernal, G. W. Burr, H. Coufal, R. K. Grygier, J. A. Hoffnagle, C. M. Jefferson, R. M. Macfarlane, R. M. Shelby, G. T. Sincerbox and G. Wittman, "HolographicData-Storage Materials," MRS Bulletin, 51–60 (September, 1996) and in IBM Holographic Optical Storage Team, "Holographic Storage Promises High Data Density" Laser Focus World, November 1996, pp81–93, all incorporated herein by reference.

Having described the invention, the following examples are given to illustrate specific applications of the invention including the best mode now known to perform the invention. These specific examples are not intended to limit the scope of the invention described in this application.

EXAMPLE

A single mode KrF excimer laser normally used to write Bragg gratings in fibers, operating at 248 nm at a repetition rate of 2 Hz, was used to record holograms in 2 mm thick samples of europium-doped Vycor glass phosphors. A 50% beamsplitter was used to divide the laser into two beams, each having ~1.4 mJ/pulse, that were overlapped in the glass samples at an angle of ~15°. Diffraction of He—Ne laser light at 633 nm was observed after exposure to just a few laser shots and the maximum diffraction efficiency of 0.15% was observed after 80 shots. FIG. 1 shows the measured diffraction efficiency vs. exposure time. The photosensitivity of this glass compares favorably with other glass types that often require tens of thousands of high fluence pulses to observe similar changes. This new storage media should permit high speed writing at reasonable laser powers.

Obviously, many modifications and variations of the present invention are possible in light of the above teachings. It is therefore to be understood that, within the scope of the appended claims, the invention may be practiced otherwise than as specifically described.

What is claimed is:

1. A method of creating a volume hologram comprising the steps of providing a volume holographic optical storage medium comprising an optically transparent glass matrix doped with an alkaline earth sulfide, Sm ions, and an additional dopant selected from the group consisting of Eu ions and Ce ions, the medium having a scattering coefficient of less than $10^{-5}$ cm$^{-1}$ and exposing the medium to an interference pattern created by intersecting a spatially modulated object beam with a reference beam, the object beam and the reference beam each having a wavelength of less than 300 nm, whereby a spatially modulated pattern of trapped charges is created within the volume of the medium, the trapped charges creating an optically readable change in the complex index of refraction of the medium.

2. The method of claim 1, wherein the alkaline earth sulfide is selected from the group consisting of MgS, CaS, SrS, and BaS.

3. A volume holographic optical storage medium having at least one volume hologram stored therein, wherein the medium comprises an optically transparent glass matrix doped with an alkaline earth sulfide, Sm ions, and an additional dopant selected from the group consisting of Eu ions and Ce ions, the medium having a scattering coefficient of less than $10^{-5}$ cm$^{-1}$.

4. The volume holographic optical storage medium of claim 3, wherein the alkaline earth sulfide is selected from the group consisting of MgS, CaS, SrS, and BaS.

* * * * *